United States Patent
Venneri et al.

(10) Patent No.: US 12,374,468 B2
(45) Date of Patent: Jul. 29, 2025

(54) AUTOMATIC SHUTDOWN CONTROLLER FOR NUCLEAR REACTOR SYSTEM WITH CONTROL DRUMS

(71) Applicant: LOKI MMR INC., New York, NY (US)

(72) Inventors: Paolo Francesco Venneri, Seattle, WA (US); Michael John Eades, Seattle, WA (US); Dirk Uys, Centurion (ZA)

(73) Assignee: LOKI MMR INC., New York, NY (US)

( * ) Notice: Subject to any disclaimer, the term of this patent is extended or adjusted under 35 U.S.C. 154(b) by 394 days.

(21) Appl. No.: 17/634,812

(22) PCT Filed: Oct. 4, 2020

(86) PCT No.: PCT/US2020/054189
§ 371 (c)(1),
(2) Date: Feb. 11, 2022

(87) PCT Pub. No.: WO2021/067902
PCT Pub. Date: Apr. 8, 2021

(65) Prior Publication Data
US 2022/0328202 A1    Oct. 13, 2022

Related U.S. Application Data

(60) Provisional application No. 62/910,561, filed on Oct. 4, 2019.

(51) Int. Cl.
*G21C 9/02*         (2006.01)
*G21C 3/62*         (2006.01)
(Continued)

(52) U.S. Cl.
CPC ............. *G21C 9/02* (2013.01); *G21C 7/12* (2013.01); *G21C 11/022* (2013.01); *G21C 11/06* (2013.01);
(Continued)

(58) Field of Classification Search
None
See application file for complete search history.

(56) References Cited

U.S. PATENT DOCUMENTS

| | | |
|---|---|---|
| 3,296,083 A | 1/1967 | Haake et al. |
| 4,106,984 A | 8/1978 | Schneider |

(Continued)

FOREIGN PATENT DOCUMENTS

| | | |
|---|---|---|
| CA | 707874 A | 4/1965 |
| GB | 938446 A | 10/1963 |

(Continued)

OTHER PUBLICATIONS

International Preliminary Report on Patentability for International Application No. PCT/US2020/054190, dated Apr. 5, 2022, 4 pages.

(Continued)

*Primary Examiner* — Sharon M Davis
(74) *Attorney, Agent, or Firm* — Buchanan Ingersoll & Rooney PC

(57) ABSTRACT

A nuclear reactor system includes a nuclear reactor core disposed in a pressure vessel. Nuclear reactor system further includes control drums disposed longitudinally within the pressure vessel and laterally surrounding fuel elements and at least one moderator element of the nuclear reactor core to control reactivity. Each of the control drums includes a reflector material and an absorber material. Nuclear reactor system further includes an automatic shutdown controller and an electrical drive mechanism coupled to rotatably control the control drum. Automatic shutdown controller (Continued)

includes a counterweight to impart a bias and an actuator. To automatically shut down the nuclear reactor core during a loss or interruption of electrical power from a power source to the electrical drive mechanism, the actuator is coupled to the counterweight and responsive to the bias to align the absorber material of one or more control drums to face inwards towards the nuclear reactor core.

16 Claims, 10 Drawing Sheets

(51) Int. Cl.
  *G21C 7/12* (2006.01)
  *G21C 11/02* (2006.01)
  *G21C 11/06* (2006.01)
  *B64D 27/22* (2006.01)
  *G21D 5/02* (2006.01)

(52) U.S. Cl.
  CPC .............. *B64D 27/22* (2013.01); *G21C 3/626* (2013.01); *G21D 5/02* (2013.01)

(56) References Cited

U.S. PATENT DOCUMENTS

| | | | |
|---|---|---|---|
| 5,410,578 | A | 4/1995 | Walton |
| 9,299,464 | B2 | 3/2016 | Venneri et al. |
| 9,620,248 | B2 | 4/2017 | Venneri |
| 10,032,528 | B2 | 7/2018 | Venneri |
| 10,109,378 | B2 | 10/2018 | Snead |
| 10,229,757 | B2 | 3/2019 | Filippone et al. |
| 10,475,543 | B2 | 11/2019 | Venneri |
| 10,573,416 | B2 | 2/2020 | Venneri |
| 10,643,754 | B2 | 5/2020 | Venneri et al. |
| 2015/0357056 | A1* | 12/2015 | Shayer .................... G21C 7/28 376/220 |
| 2016/0042815 | A1* | 2/2016 | Hough .................... G21C 9/02 376/219 |
| 2017/0263345 | A1* | 9/2017 | Venneri .................. B64G 1/408 |
| 2019/0172594 | A1* | 6/2019 | Lyons ...................... G21C 7/14 |
| 2020/0027587 | A1 | 1/2020 | Venneri |

FOREIGN PATENT DOCUMENTS

| | | |
|---|---|---|
| JP | H08-129093 A | 5/1996 |
| JP | 2016-515191 A | 5/2016 |
| NO | 116169 B | 2/1969 |

OTHER PUBLICATIONS

International Preliminary Report on Patentability for International Application No. PCT/US2020/054189, dated Apr. 5, 2022, 4 pages.
International Search Report and Written Opinion for International Application No. PCT/US2020/054189, dated Feb. 17, 2021, 6 pages.
The extended European Search Report issued Nov. 2, 2023, by the European Patent Office in corresponding European Patent Application No. 20873266.9-1212. (12 pages).
Office Action (Notice of Reasons for Rejection) issued Jun. 25, 2024, by the Japan Patent Office in corresponding Japanese Patent Application No. 2022-513243 and an English translation of the Office Action. (7 pages).
Partial Supplementary European Search Report for European Application No. 20873266.9, dated Aug. 1, 2023, 14 pages.
Office Action (Notice of Preliminary Rejection) issued Jun. 18, 2025, by the Korean Intellectual Property Office in corresponding Korean Patent Application No. 10-2022-7014929 with English language summary. (6 pages).

* cited by examiner

AUTOMATIC SHUTDOWN CONTROLLER FOR NUCLEAR REACTOR SYSTEM WITH CONTROL DRUMS

CROSS-REFERENCE TO RELATED APPLICATIONS

This application is a U.S. National Phase Patent Application of International Application No. PCT/US2020/054189, filed on Oct. 4, 2020, the entirety of which is incorporated by reference herein. International Application No. PCT/US2020/054189 claims priority to U.S. Provisional Patent Application No. 62/910,561, filed on Oct. 4, 2019, titled "Nuclear System for Power Production in Space," the entirety of which is incorporated by reference herein.

This application relates to International Application No. PCT/US2020/054190, filed on Oct. 4, 2020, titled "Nuclear Reactor Core Architecture with Enhanced Heat Transfer and Safety," which published as International Publication No. WO 2021/067903 on Apr. 8, 2021, the entirety of which is incorporated by reference herein. This application also relates to International Application No. PCT/US2020/054188, filed on Oct. 4, 2020, titled "Integrated In-Vessel Neutron Shield," which published as International Publication No. WO 2021/067901 on Apr. 8, 2021, the entirety of which is incorporated by reference herein.

TECHNICAL FIELD

The present subject matter relates to examples of nuclear systems and nuclear reactors for power production and propulsion, e.g., in remote regions, such as outer space. The present subject matter also encompasses a nuclear reactor system that includes an automatic shutdown controller that rotates control drums for safety, e.g., during a loss or interruption of electrical power to an electrical drive mechanism that rotatably controls the control drums.

BACKGROUND

Nuclear fission reactors include thermal or fast type reactors. Currently, almost all operating nuclear fission reactors are thermal. Nuclear fission reactors include nuclear fuel inside a nuclear reactor core and a moderator to slow down fast neutrons so that nuclear fission can continue. Typically, the nuclear fuel is formed in cylindrical shaped fuel compacts or pellets. The fuel compacts are loaded into fuel pins or rods, cladded, and stacked inside the numerous columns of fuel elements in the nuclear reactor core.

A nuclear reactor burns nuclear fuel at extremely high temperatures, facilitated by a reflector. The reflector redirects free neutrons back toward the nuclear reactor core, increasing the number of fissile reactions, energy production, and nuclear reactor core operating temperature. Some nuclear reactor architectures also include control drums located near the reflector to selectively regulate the neutron population and nuclear reactor power level during operation. By selectively regulating the neutron population, the control drums also directly impact the nuclear reactor core operating temperature.

Operating temperatures that exceed the design constraints of the nuclear reactor can result in the nuclear reactor core overheating, which presents a problem scenario known as a core meltdown. A core meltdown involves the nuclear reactor core becoming superheated and melting through containment layers, directly harming the nuclear reactor and the surrounding space. Core meltdowns can be avoided by safely lowering the nuclear reactor core temperature to a temperature low enough to avoid melting of containment layers. Generally, nuclear reactor cores operating at lower temperatures are more tolerant of unexpected errors; however, higher temperature nuclear reactors obtain superior performance.

In a nuclear reactor for conventional terrestrial land applications, e.g., a nuclear power plant, the nuclear reactor is typically built in a location that is isolated away from human life. In the conventional terrestrial land application, the size and mass of the nuclear reactor is not a major concern: generally, the goal is to build as large and efficient of a nuclear power plant as possible, to provide the maximum amount of electrical power. The nuclear power plant is actively staffed by human operators (e.g., skilled engineers, scientists, and technicians), as the nuclear reactor needs to be actively monitored and maintained to provide optimal electrical output and ensure safety. If a problem arises with the nuclear reactor, the human operators are alerted and can remediate the problem, such as a misalignment of control drums that may cause core meltdown.

In nuclear reactor systems for nuclear thermal propulsion (NTP), the size and mass of the nuclear reactor directly impact performance. A reduced size and mass of the NTP nuclear reactor system is needed for technical feasibility and commercial viability. Hence, in an NTP nuclear reactor system, the nuclear reactor is located within or very close proximity to a vehicle coupled to the nuclear reactor. If the vehicle coupled to the NTP nuclear reactor is occupied by a human, isolation of the nuclear reactor from human life is infeasible. For example, the NTP nuclear reactor may need to be located closely crew quarters of a spacecraft vehicle.

In nuclear reactor systems for providing nuclear power (e.g., thermal and/or electrical power) in remote region applications including outer space, celestial bodies, planetary bodies, and remotes regions on Earth, monitoring and maintenance of the nuclear reactor by human operators is difficult. For example, performing emergency monitoring and maintenance in remote regions is infeasible because the nuclear reactor is deployed far away from human operators with the required technical knowledge for monitoring and maintenance.

Even if human operators are available when a problem arises, manual human intervention may requires time and is susceptible to human error, which means that nuclear reactor shutdown cannot be entrusted solely to human operators of the nuclear reactor system. Accordingly, automatic safeguards to prevent a high nuclear reactor core operating temperature that exceeds the design constraints of the nuclear reactor are needed.

SUMMARY

The various examples disclosed herein relate to nuclear technologies for nuclear reactor systems both for space or terrestrial land applications. To improve safety and reliability of the nuclear reactor system 100, an automatic shutdown controller 111 allows for consistent automatic shutdown when a nuclear reactor 107 is in an unexpected or dangerous state during a loss or interruption of electrical power 153A-B to an electrical drive mechanism 119 that adjusts the control drums 115A-N. Shutting down the nuclear reactor core 101 decreases neutron flux, or neutron fluence during a particular period of time, below the neutron replacement rate, placing the nuclear reactor core 101 into a subcritical state.

To automatically shut down a nuclear reactor core 101 during a loss or interruption of electrical power 153A-B from a power source 154A-B to an electrical drive mechanism 119, an automatic shutdown controller 111 automatically aligns an absorber material 117 that forms control drums 115A-N to face inwards towards the nuclear reactor core 101. By moving a reflector material 116 that also forms the control drums 115A-N to face outwards away from the nuclear reactor core 101, the automatic shutdown controller 111 advantageously increases safety of the nuclear reactor system 100 by lowering operating temperature and decreasing the need for active oversight of the nuclear reactor core 101. The automatic shutdown controller 111 decreases neutron flux in the nuclear reactor core 101, and therefore operating temperature when the nuclear reactor 107 loses external power and transitions to the unexpected or dangerous state.

An example nuclear reactor system 100 includes a pressure vessel 160 and a nuclear reactor core 101 disposed in the pressure vessel 160. The nuclear reactor core 101 includes a plurality of fuel elements 104A-N and at least one moderator element 103A. Nuclear reactor system 100 further includes a plurality of control drums 115A-U disposed longitudinally within the pressure vessel 160 and laterally surrounding the plurality of fuel elements 104A-N and the at least one moderator element 103A to control reactivity of the nuclear reactor core 101. Each of the control drums 115A-U includes a reflector material 116 on a first portion 166 of an outer surface 165 and an absorber material 117 on a second portion 167 of the outer surface 165.

Nuclear reactor system 100 further includes an automatic shutdown controller 111. The automatic shutdown controller 111 includes a counterweight 125A that is external or internal to a control drum 115A of the plurality of control drums 115A-N to impart a bias (e.g., apply a force) on the control drum 115A. The automatic shutdown controller 111 further includes an actuator 120A coupled to the counterweight 125A.

Nuclear reactor system 100 further includes an electrical drive mechanism 119A that is: (a) powered by electrical power 153A-B from a power source 154A-B; (b) coupled to rotatably control the control drum 115A; and further coupled to the actuator 120. The electrical drive mechanism 119, the actuator 120A, or both the electrical drive mechanism 119 and the actuator 120A counteract the bias of the counterweight 125A during availability of the electrical power 153A-B from the power source 154A-B. During a loss or interruption of the electrical power 153A-B from the power source 154A-B such that the electrical power 153A-B is no longer available to the electrical drive mechanism 119A, the actuator 120A is coupled to the counterweight 125A and responsive to the bias to align the absorber material 117 of the control drum 115A to face inwards towards the nuclear reactor core 101.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

PARTS LISTING

Figure 1A:
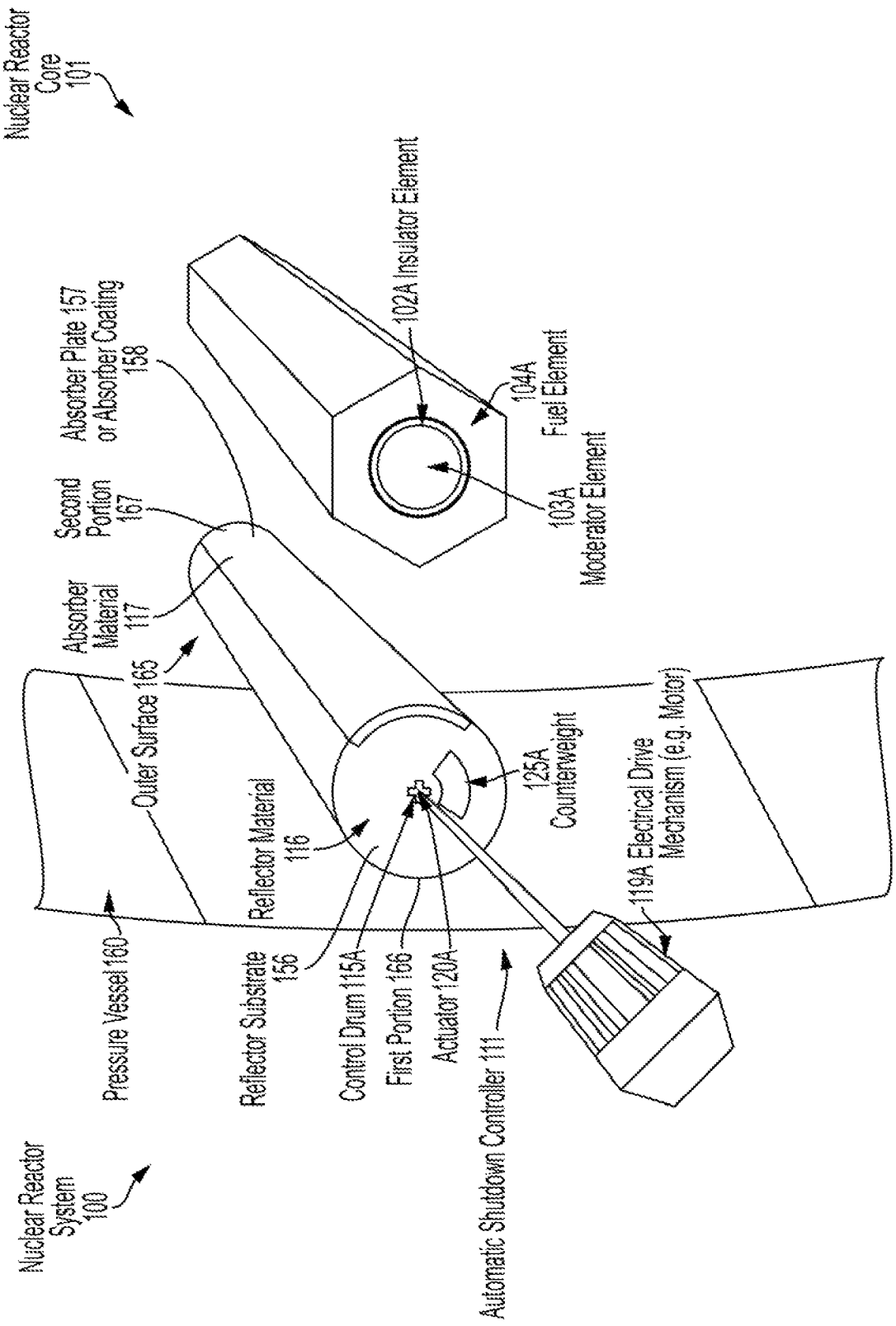
FIG. 1A illustrates a nuclear reactor system that implements an automatic shutdown controller, a control drum, an electrical drive mechanism, and an example fuel element of a nuclear reactor core.

100 Nuclear Reactor System
101 Nuclear Reactor Core
102A-N Insulator Elements
103A-N Moderator Elements
104A-X Fuel Elements
107 Nuclear Reactor
111 Automatic Shutdown Controller
112 Insulator Element Array
113 Moderator Element Array
114 Nuclear Fuel Tile Array
115A-U Control Drums
116 Reflector Material
117 Absorber Material
119A-R Electrical Drive Mechanism
120A-R Actuators
121A-N Moderator Coolant Passages
125A-R Counterweights
140 Reflector
141A-N Reflector Blocks
153A-B Electrical Power
154A Line Power Source
154B Non-Line Power Source
156 Reflector Substrate
157 Absorber Plate
158 Absorber Coating
160 Pressure Vessel
165 Outer Surface
166 First Portion
167 Second Portion 210 Main Axle
211 Secondary Axle
212 Bevel Gear
225 Counterweight
400 Guide Ramp
401 Guide Surface
402 Control Drum Reciprocal Surface
403 Lower End
404 Lowest Part
406 Highest Part
410 Upper Plate
411 Lower Plate

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical or physical connection. Unless described otherwise, coupled elements or devices are not necessarily directly connected to one another and may be separated by intermediate components, elements, etc.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The term "approximately" or "substantially" means that the parameter value or the like varies up to ±10% from the stated amount.

The orientations of the nuclear reactor system 100 and nuclear reactor 107, associated components, and/or any nuclear reactor system 100 incorporating the nuclear reactor core 101, automatic shutdown controller 111, control drums 115A-U, actuators 120A-R, counterweights 125A-R, and electrical drive mechanisms 119A-R, such as shown in any of the drawings, are given by way of example only, for illustration and discussion purposes. In operation for a particular nuclear reactor system 100, the components may be oriented in any other direction suitable to the particular application of the nuclear reactor system 100, for example upright, sideways, or any other orientation. Also, to the extent used herein, any directional term, such as lateral, longitudinal, up, down, upper, lower, top, bottom, and side, are used by way of example only, and are not limiting as to direction or orientation of any nuclear reactor system 100 or component of the nuclear reactor system 100 constructed as otherwise described herein.

Figure 1B:
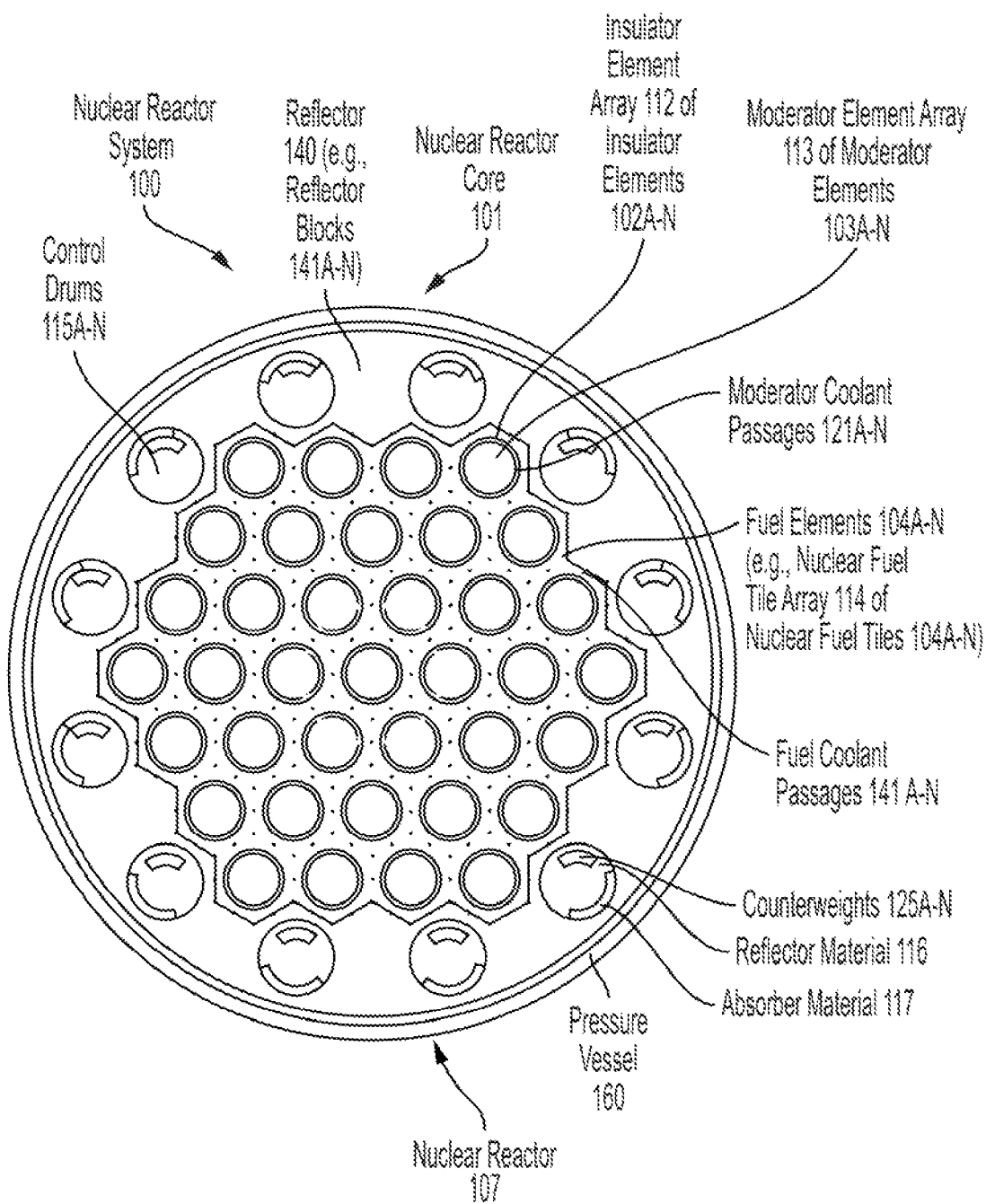
FIG. 1B is a cross-sectional view of a nuclear reactor core that can be implemented in the nuclear reactor system, control drums, and counterweights of the automatic shutdown controller.

FIG. 1A illustrates a nuclear reactor system 100 that implements an automatic shutdown controller 111, a control drum 115A, an electrical drive mechanism 119A, and an example fuel element 104A of a nuclear reactor core. FIG. 1B is a cross-sectional view of a nuclear reactor core 101 that can be implemented in the nuclear reactor system 100, control drums 115A-N, and counterweights 125A-N of the automatic shutdown controller 111.

Referring to both FIGS. 1A-B, the nuclear reactor system 100 includes a pressure vessel 160 and a nuclear reactor core 101 disposed in the pressure vessel 160. The nuclear reactor core 101 includes a plurality of fuel elements 104A-N and at least one moderator element 103A. Nuclear reactor system 100 further includes a plurality of control drums 115A-U disposed longitudinally within the pressure vessel 160 and laterally surrounding the plurality of fuel elements 104A-N and the at least one moderator element 103A to control reactivity of the nuclear reactor core 101. Each of the control drums 115A-U includes a reflector material 116 on a first portion 166 of an outer surface 165 and an absorber material 117 on a second portion 167 of the outer surface 165.

Nuclear reactor system 100 further includes an automatic shutdown controller 111. The automatic shutdown controller 111 includes a counterweight 125A that is external or internal to a control drum 115A of the plurality of control drums 115A-N to impart a bias (e.g., apply a force) on the control drum 115A. The automatic shutdown controller 111 further includes an actuator 120A coupled to the counterweight 125A.

Nuclear reactor system 100 further includes an electrical drive mechanism 119A that is: (a) powered by electrical power 153A-B from a power source 154A-B; (b) coupled to rotatably control the control drum 115A; and further coupled to the actuator 120. The electrical drive mechanism 119, the actuator 120A, or both the electrical drive mechanism 119 and the actuator 120A counteract the bias of the counterweight 125A during availability of the electrical power 153A-B from the power source 154A-B. During a loss or interruption of the electrical power 153A-B from the power source 154A-B such that the electrical power 153A-B is no longer available to the electrical drive mechanism 119A, the actuator 120A is coupled to the counterweight 125A and responsive to the bias to align the absorber material 117 of the control drum 115A to face inwards towards the nuclear reactor core 101.

Figure 2A:
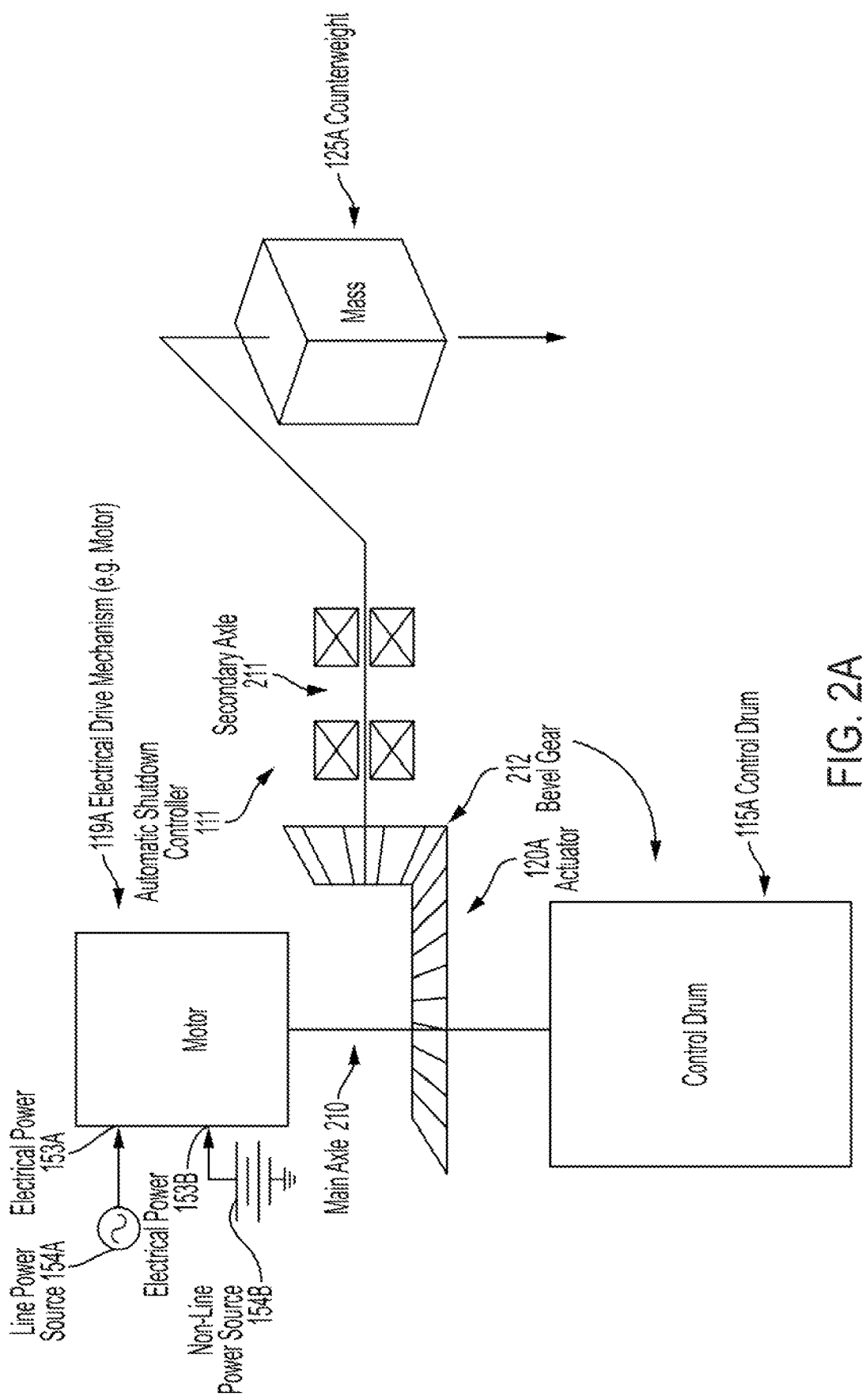
FIG. 2A illustrates the automatic shutdown controller of the nuclear reactor system, in which an actuator of the automatic shutdown controller includes a bevel gear and a main axle.
Figure 2B:
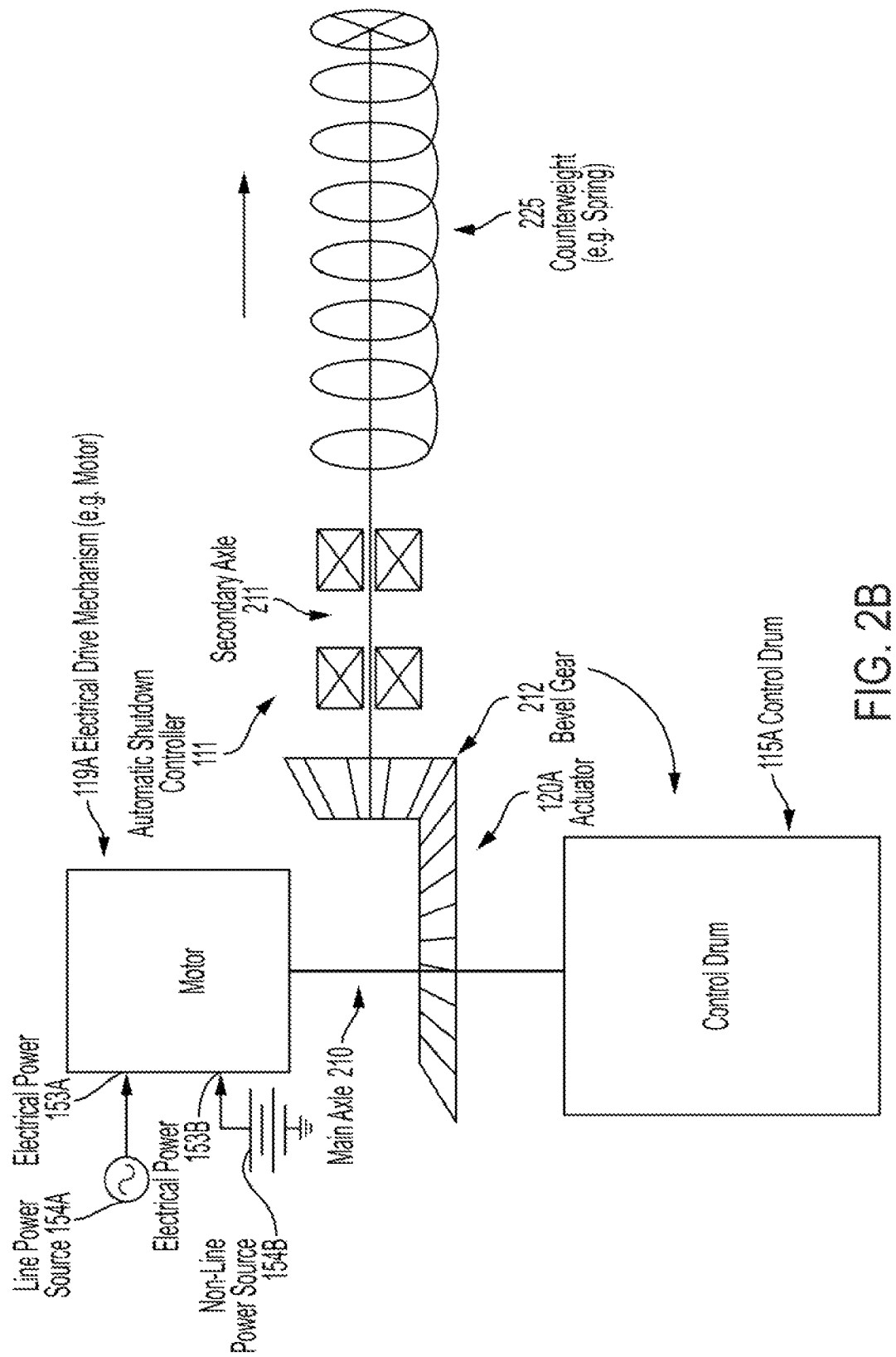
FIG. 2B illustrates the automatic shutdown controller of the nuclear reactor system, in which the actuator includes the bevel gear and a counterweight includes a spring.
Figure 4A:
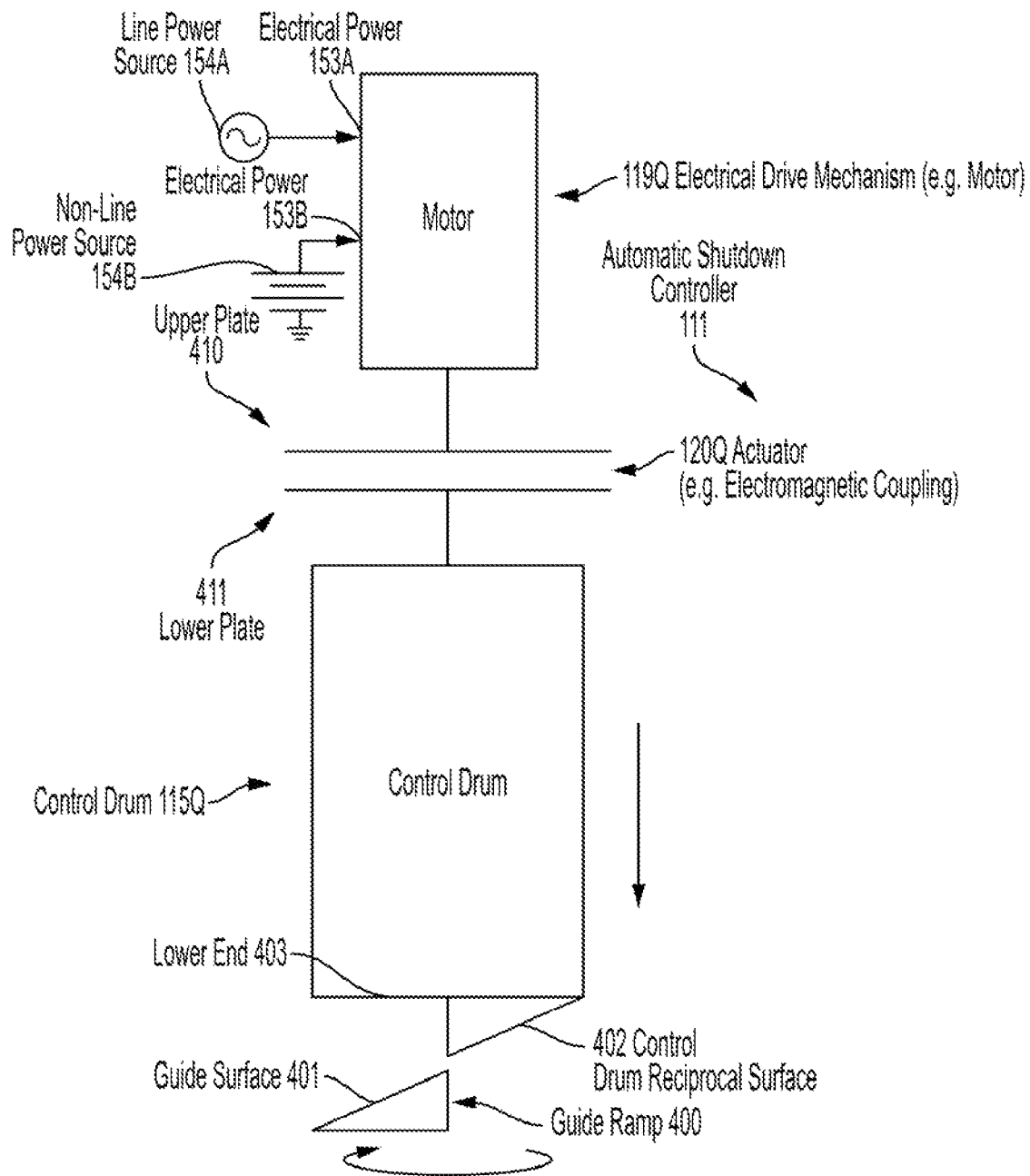
FIG. 4A illustrates the automatic shutdown controller of the nuclear reactor system, in which the actuator includes an electromagnetic coupling and the automatic shutdown controller further includes a guide surface and a control drum reciprocal surface.
Figure 4B:
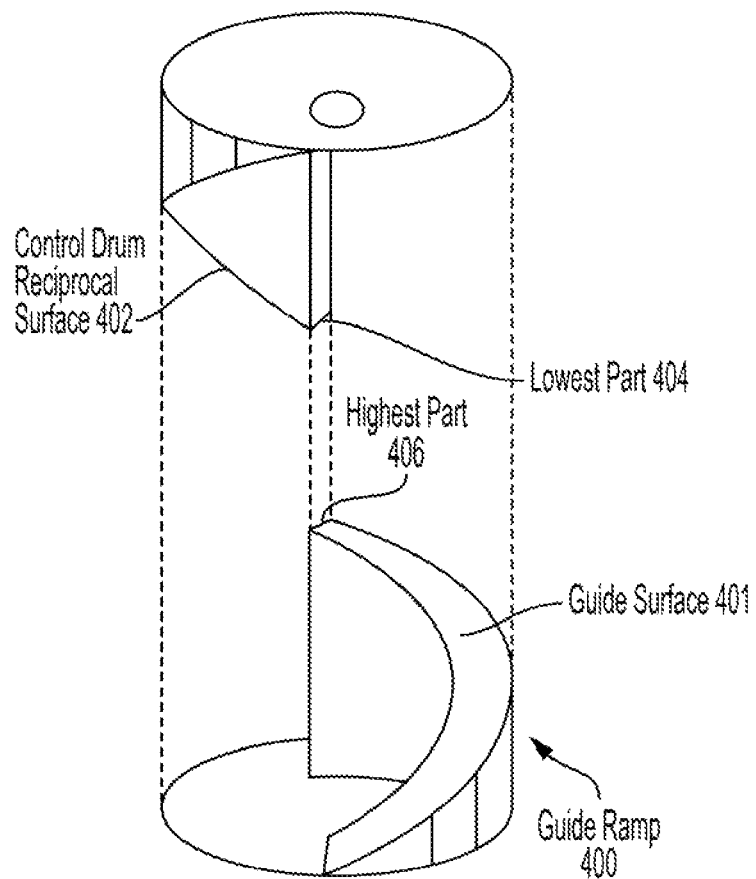
FIG. 4B illustrates the guide surface and the control drum reciprocal surface before rotation.

Although not depicted in FIGS. 1A-B, the line power source 154A shown in FIGS. 2A-B and 4B conveys electrical power 153A, sometimes referred to as grid power, household power, household electricity, house current, powerline, domestic power, wall power, line power, AC power, city power, street power that is produced by an electric utility provider. The electrical power 153A can be alternating current (AC) electric power produced and delivered via AC mains to homes and businesses. Electrical power 153A can be independent (e.g., separate) from the electrical energy produced from the nuclear reactor system 100 or can be electrical energy produced from the nuclear reactor system 100 looped back to the control drums 115A-N. Independence of the line power source 154A from the nuclear reactor system 100 may avoid a runaway nuclear reactor situation. If the nuclear reactor core 101 conveys the electrical power 153A that keeps the reflector material 116 facing inwards towards the nuclear reactor core 101, then a supercritical nuclear reactor core 101 continues to convey the electrical power 153A even though the neutron flux should be reduced. By establishing an independent line power source 154A, the electrical power 153A can be cut independently from the nuclear reactor core 101 to initiate the automatic shutdown controller 111.

Non-line power source 154B conveys electrical power 153B and can be a battery (e.g., charged by electrical energy produced from the nuclear reactor system 100 or a separate energy source), solar panel, or any other AC or DC source (e.g. a generator) that is not line powered. The line power source 154A, non-line power source, 154B, or both the line power source 154A and the non-line power source 154B can supply electrical power 153A-B to the electrical drive mechanism 119A.

Referring now more specifically to FIG. 1A, the fuel element 104A emits free neutrons, and is designed to generate heat energy within the nuclear reactor core 101 of the nuclear reactor system 100. In the example of FIG. 1A, a moderator element 103A is paired with the fuel element 104A, and is designed to slow down fast neutrons while still allowing the nuclear reactor core 101 to produce heat energy. A pressure vessel 160 includes the nuclear reactor core 101 disposed therein, as well as the control drums 115A-N. In some examples, the pressure vessel 160 includes the electrical drive mechanism 119A disposed therein. Because the pressure vessel 160 is pressurized to a relatively high internal pressure, to avoid large forces associated with high pressure drops, the electrical drive mechanism 119A can be housed within pressure bearing housings, such as tubular extensions from the pressure vessel 160.

Control drums 115A-N regulate the neutron population in the nuclear reactor core 101 and nuclear reactor power level like control rods in other nuclear reactor systems. To increase or decrease neutron flux in the nuclear reactor core 101, the control drums 115A-N are rotated; whereas control rods are inserted or removed from the nuclear reactor core 101. Because the control drums 115A-N are rotated to adjust reactivity of the nuclear reactor core 101, instead of being inserted and removed, the control drums 115A-N have a permanently fixed longitudinal position: the control drums 115A-N do not move in or out of the nuclear reactor core 101 or pressure vessel 160. There are risks that control rods may not insert fully into the nuclear reactor core 101 due to misalignment or blockages in a control rod hole, and utilizing control drums 115A-N advantageously reduces those risks.

As shown in FIG. 1A, a first portion 166 of an outer surface 165 of the control drum 115A includes a reflector material 116, which is generally formed of a material with a high elastic scattering neutron cross section. When the reflector material 116 faces inwards towards the nuclear reactor core 101, the neutron flux increases, which increases the reactivity and operating temperature of the nuclear reactor core 101. A second portion 167 of the outer surface 165 of the control drum 115A includes an absorber material 117, which can be formed of a neutron poison. Neutron poisons are isotopes or molecules with a high absorption neutron cross section particularly suited to absorbing free neutrons. When the absorber material 117 faces inwards towards the nuclear reactor core 101, the neutron flux decreases, which decreases the reactivity and operating temperature of the nuclear reactor core 101.

Nuclear reactor system 100 includes the electrical drive mechanism 119A to selectively rotate the control drum 115A or a plurality of control drums 115A-N to face either the absorber material 117 towards the nuclear reactor core 101, decreasing nuclear flux and operating temperature, or the reflector material 116 towards the nuclear reactor core 101, increasing nuclear flux and operating temperature. Electrical drive mechanism 119A includes a motor, for example. During availability of the electrical power 153A-B from the power source 154A-B, the electrical drive mechanism 119A maintains the control drum 115A at a permanently fixed longitudinal position.

Automatic shutdown controller 111 includes an actuator 120A, such as a mechanical actuator. In FIG. 1A, the mechanical actuator can include a simple axle. Automatic shutdown controller 111 further includes the counterweight 125A, which is a weighted segment of the control drum 115A. The counterweight 125A, the actuator 120A, and the electrical drive mechanism 119A are disposed within the pressure vessel 160. With the addition of the automatic shutdown controller 111 to the nuclear reactor system 100, the electrical drive mechanism 119A still selectively increases or decreases neutron flux and operating temperature in the nuclear reactor core 101.

When the electrical drive mechanism 119A becomes inoperable, for example, due to a loss or interruption of electrical power 153A-B from a power source 154A-B, then the counterweight 125A is able to turn the control drum 115A. The counterweight 125A turns the control drum 115A when the counterweight 125A does not have minimum potential energy, i.e., when the counterweight 125A is at the nadir position (e.g., lowest point) of a pendulum arc originating at a center axis of the control drum 115A.

In FIG. 1A, the electrical device mechanism 119A has lost or interrupted electrical power 153A-B from the power source 154A-B. Hence, the absorber material 117 of the control drum 115A is facing inwards towards the fuel element 104A of the nuclear reactor core 101 and the other control drums 115B-N are similarly facing inwards. In FIG. 1B, the electrical device mechanism 119A is receiving electrical power 153A-B from the power source 154A-B. Hence, the absorber material 117 of the control drums 115A-N are facing outwards away from the fuel elements 104A-N of the nuclear reactor core 101 and the reflector material 116 is facing inwards towards the fuel elements 104A-N. As further shown in FIG. 1B, the counterweights 125A-N can be movable and change orientation due to gravity, and are therefore shown in differing orientations relative to the absorber material 117 of control drums 115A-N.

In FIG. 1A, the counterweight 125A is oriented at a nadir position, and cannot further rotate the control drum 115A. However, when the counterweight 125A is oriented as shown in FIG. 1B, then the counterweight 125A is at an apex position (e.g., highest point), and rotates the control drum 115A approximately 180 degrees as the counterweight 125A falls from the apex position of FIG. 1B to the nadir position of FIG. 1A, rotating around a center axis of the control drum 115A.

During availability of the electrical power from the power source 154A-B of the nuclear reactor system 100, the electrical drive mechanism 119A can selectively increase or decrease neutron flux of the nuclear reactor core 101. To rapidly decrease neutron flux and achieve an increased flux state (see FIG. 1A), the electrical drive mechanism 119A can rotate the control drum 115A to maximally expose the absorber material 117 of the control drum 115A to the fuel elements 104A-N of the nuclear reactor core 101, thereby absorbing more free neutrons and decreasing neutron flux. To rapidly increase neutron flux and achieve a decreased flux state (see FIG. 1B), the electrical drive mechanism 119A can rotate the control drum 115A via the actuator 120A to maximally expose the reflector material 116 of the control drum 115A to the fuel elements 104A-N of the nuclear reactor core 101, thereby reflecting more free neutrons and increasing neutron flux. To make an intermediate adjustment or sustain a continuous level of neutron flux, the electrical drive mechanism 119A can rotate the control drum 115A via the actuator 120A to a partial exposure of the absorber material 117 of the control drum 115A to the fuel elements 104A-N of nuclear reactor core 101.

Electrical drive mechanism 119A can maintain an increased flux state by actively rotating the actuator 120A simultaneously with the control drum 115A. The counterweight 125A imparts a bias (e.g., applies a force) to attempt to rotate the actuator 120A in the opposite direction, as the counterweight 125A attempts to "fall" from the apex position of counterweight 125A to the nadir position of counterweight 125A. When the electrical drive mechanism 119A shuts off during the loss or interruption of electrical power 153A-B from the power source 154A-B, the force of the "falling" counterweight 125A overcomes the now-absent force of the drive mechanism 119A, and the control drum 115A rotates from the increased flux state (see FIG. 1B), with the reflector material 116 facing inwards towards the nuclear reactor core 101, to the decreased flux state (see FIG. 1A), with the absorber material 117 facing inwards towards the nuclear reactor core 101.

Control drum 115A can include physical stops on the axis of rotation of control drum 115A, which can be built into the actuator 120A to only allow the control drum 115A to rotate within a 180 degree angle, regardless of how much bias (e.g., force) the counterweight 125A or the electrical drive mechanism 119A imparts (e.g., applies). Alternatively, the electrical drive mechanism 119A can be configured to only output a rotational force equal to the rotational force generated by the counterweight 125A at the apex position of the counterweight 125A.

In the implementation of FIG. 1B, the plurality of fuel elements 104A-N are arranged as a nuclear fuel tile array 114 of nuclear fuel tiles 104A-N and the nuclear reactor core 101 includes a plurality of moderator elements 103A-N. In a second example, the nuclear reactor core 101 can be implemented like the nuclear reactor core 110 described in FIGS. 3-4 and the associated text of U.S. Pat. No. 10,643,754 to Ultra Safe Nuclear Corporation of Seattle, Washington, issued May 5, 2020, titled "Passive Reactivity Control of Nuclear Thermal Propulsion Reactors" the entirety of which is incorporated by reference herein. In the second example, the fuel elements 104A-N can be implemented like the fuel elements 310A-N and the moderator elements 103A-N can be implemented like the tie tubes 320A-N described in FIGS. 3-4 and the associated text of U.S. Pat. No. 10,643,754.

In a third example, the nuclear reactor core 101 can be implemented like the nuclear reactor core 101 described in FIG. 2C and the associated text of U.S. Patent Pub. No. 2020/0027587 to Ultra Safe Nuclear Corporation of Seattle, Washington, published Jan. 23, 2020, titled "Composite Moderator for Nuclear Reactor Systems," the entirety of which is incorporated by reference herein. In the third example, the fuel elements 104A-N can be implemented like the fuel elements 102A-N and the moderator elements 103A-N can be implemented like the composite moderator blocks described in FIG. 2C and the associated text of U.S. Patent Pub. No. 2020/0027587.

Nuclear reactor 107 includes a reflector 140 (e.g., an outer reflector region) located inside the pressure vessel 160. Reflector 140 includes a plurality of reflector blocks 141A-N laterally surrounding the plurality of fuel elements 104A-N and the at least one moderator element 103A.

Nuclear reactor 107 includes the nuclear reactor core 101, in which a controlled nuclear chain reactions occurs, and energy is released. The neutron chain reaction in the nuclear reactor core 101 is critical—a single neutron from each fission nucleus results in fission of another nucleus—the chain reaction must be controlled. By sustaining controlled nuclear fission, the nuclear reactor system 100 produces heat energy. In an example implementation, the nuclear reactor system 100 is implemented as a gas-cooled high temperature nuclear reactor 107. However, the nuclear reactor system 100 with the automatic shutdown controller 111 can improve safety of the nuclear reactor 107 and reduce monitoring and maintenance by human operators in a large utility scale nuclear reactor, heat pipe nuclear reactor, molten-salt-cooled nuclear reactor, fuel-in-salt nuclear reactor, or a sodium-cooled fast nuclear reactor. For example, automatic shutdown controller 111 can be included in a nuclear reactor system 100, such as a gas-cooled graphite-moderated nuclear reactor, a fluoride salt-cooled high-temperature nuclear reactor with a higher thermal neutron flux than the gas-cooled graphite-moderated nuclear reactor, or a sodium fast nuclear reactor with a faster neutron flux than the gas-cooled graphite-moderated nuclear reactor.

In the depicted example, the nuclear reactor system 100 with the nuclear reactor core 101 is utilized in a space environment, such as in a nuclear thermal propulsion (NTP) system. An example NTP system that the automatic shutdown controller 111 can be implemented in is described in FIGS. 1-2 and the associated text of U.S. Pat. No. 10,643,754 to Ultra Safe Nuclear Corporation of Seattle, Washington, issued May 5, 2020, titled "Passive Reactivity Control of Nuclear Thermal Propulsion Reactors" the entirety of which is incorporated by reference herein. For example, the nuclear reactor system 100 that includes the automatic shutdown controller 111 can be a nuclear thermal rocket reactor, nuclear electric propulsion reactor, Martian surface reactor, or lunar surface reactor.

In such an NTP system (e.g., compact space nuclear reactor), a generated thrust propels a vehicle that houses, is formed integrally with, connects, or attaches to the nuclear reactor core 101, such as a rocket, drone, unmanned air vehicle (UAV), aircraft, spacecraft, missile, etc. Typically, this is done by heating a propellant, typically low molecular weight hydrogen, to over 2,600° Kelvin by harnessing thermal energy from the nuclear reactor core 101. In addition, the NTP nuclear reactor system 100 can be used in the propulsion of submarines or ships. As noted above, the nuclear reactor system 100 can also be a nuclear power plant in a terrestrial land application, e.g., for providing nuclear power (e.g., thermal and/or electrical power) for remote region applications including outer space, celestial bodies, planetary bodies, and remotes regions on Earth. For example, the nuclear reactor system 100 with the automatic shutdown controller 111 is utilized in a space reactor for electrical power production on a planetary surface. The nuclear reactor system 100 with the automatic shutdown controller 111 can be a small commercial fission power system for near term space operations, lunar landers, or a commercial fission power system for high-power spacecraft and large-scale surface operations, such as in-situ resource utilization.

Nuclear reactor system 100 can also be a terrestrial power system, such as a nuclear electric propulsion (NEP) system for fission surface power (FSP) system. NEP powers electric thrusters such as a Hall-effect thruster for robotic and human spacecraft. FSP provides power for planetary bodies such as the moon and Mars. In the NEP and FSP power applications, the nuclear reactor system 100 heats a working fluid (e.g., He, HeXe, Ne, $CO_2$) through a power conversion system (e.g., Brayton) to produce electricity. Moreover, in the NEP and FSP power applications, the nuclear reactor system 100 does not include a propellant, but rather includes a working fluid that passes through a reactor inlet when producing power. In the NEP and FSP power applications, the moderator elements 103A-N can be cooled via the reactor inlet working fluid (e.g., the flow coming out of a recuperator) before the working fluid passes through the fuel elements 104A-N.

Each of the fuel elements 104A-N, shown as nuclear fuel tiles 104A-N, includes a nuclear fuel. The nuclear fuel includes a fuel compact comprised of coated fuel particles, such as tristructural-isotropic (TRISO) fuel particles embedded inside a high-temperature matrix. In some implementations, the nuclear fuel includes a fuel compact comprised of bistructural-isotropic (BISO) fuel particles embedded inside the high-temperature matrix. The high-temperature matrix includes silicon carbide, zirconium carbide, titanium carbide, niobium carbide, tungsten, molybdenum, or a combination thereof. Each of the TRISO fuel particles can include a fuel kernel surrounded by a porous carbon buffer layer, an inner pyrolytic carbon layer, a binary carbide layer (e.g., ceramic layer of SiC or a refractory metal carbide layer), and an outer pyrolytic carbon layer. The refractory metal carbide layer of the TRISO fuel particles can include at least one of titanium carbide (TiC), zirconium carbide (ZrC), niobium carbide (NbC), tantalum carbide, hafnium carbide, ZrC—ZrB$_2$ composite, ZrC—ZrB$_2$—SiC composite, or a combination thereof. The high-temperature matrix can be formed of the same material as the binary carbide layer of the TRISO fuel particles.

A description of TRISO fuel particles dispersed in a silicon carbide matrix to form a cylindrical shaped nuclear fuel compact is provided in the following patents and publications of Ultra Safe Nuclear Corporation of Seattle, Washington: U.S. Pat. No. 9,299,464, issued Mar. 29, 2016, titled "Fully Ceramic Nuclear fuel and Related Methods"; U.S. Pat. No. 10,032,528, issued Jul. 24, 2018, titled "Fully Ceramic Micro-encapsulated (FCM) fuel for CANDUs and Other Reactors"; U.S. Pat. No. 10,109,378, issued Oct. 23, 2018, titled "Method for Fabrication of Fully Ceramic Microencapsulation Nuclear Fuel"; U.S. Pat. No. 9,620,248, issued Apr. 11, 2017 and U.S. Pat. No. 10,475,543, issued Nov. 12, 2019, titled "Dispersion Ceramic Micro-encapsulated (DCM) Nuclear Fuel and Related Methods"; U.S. Patent Pub. No. 2020/0027587, published Jan. 23, 2020, titled "Composite Moderator for Nuclear Reactor Systems"; and U.S. Pat. No. 10,573,416, issued Feb. 25, 2020, titled "Nuclear Fuel Particle Having a Pressure Vessel Comprising Layers of Pyrolytic Graphite and Silicon Carbide," the entireties of which are incorporated by reference herein. As described in those Ultra Safe Nuclear Corporation patents, the nuclear fuel can include a cylindrical fuel compact or pellet comprised of TRISO fuel particles embedded inside a silicon carbide matrix to create a cylindrical shaped nuclear fuel compact.

As shown, nuclear reactor core 101 includes an insulator element array 112 of insulator elements 102A-N and a moderator element array 113 of moderator elements 103A-N. Insulator elements 102A-N are formed of a high-temperature thermal insulator material with low thermal conductivity. The high-temperature thermal insulator material can include low density carbides, metal-carbides, metal-oxides, or a combination thereof. More specifically, the high-temperature thermal insulator material includes low density SiC, stabilized zirconium oxide, aluminum oxide, low density ZrC, low density carbon, or a combination thereof. Moderator elements 103A-N are formed of a low-temperature solid-phase moderator. The low-temperature solid-phase moderator includes MgH$_x$, YH$_x$, ZrH$_x$, CaH$_x$, ZrO$_x$, CaO$_x$, BeO$_x$, BeC$_x$, Be, enriched boron carbide, $^{11}$B$_4$C, CeH$_x$, LiH$_x$, or a combination thereof.

In an NTP, NEP, or FSP nuclear reactor system 100, the nuclear reactor 107 can include a plurality of control drums 115A-N and a reflector 140. The control drums 115A-N may laterally surround the insulator element array 112 of insulator elements 102A-N, the moderator element array 113 of moderator elements 103A-N, and nuclear fuel tile array 114 of nuclear fuel tiles 104A-N to change reactivity of the nuclear reactor core 101 by rotating the control drums 115A-N. As depicted, the control drums 115A-N reside on the perimeter or periphery of a pressure vessel 160 and are positioned circumferentially around the insulator elements 102A-N, moderator elements 103A-N, and nuclear fuel tiles 104A-N of the nuclear reactor core 101. Control drums 115A-N may be located in an area of the reflector 140, e.g., an outer reflector region formed of reflector blocks 141A-N immediately surrounding the nuclear reactor core 101, to selectively regulate the neutron population and reactor power level during operation. For example, the control drums 115A-N can be a cylindrical shape and formed of both a reflector material 116 (e.g., beryllium (Be), beryllium oxide (BeO), BeSiC, BeMgO, Al$_2$O$_3$, etc.) on a first portion 166 of an outer surface 165 and an absorber material 117 on a second portion 167 of the outer surface 165 (e.g., outer circumference).

The reflector material 116 and the absorber material 117 can be on opposing sides of the cylindrical shape, e.g., portions of an outer circumference, of the control drums 115A-N. The reflector material 116 can include a reflector substrate 156 shaped as a cylinder or a truncated portion thereof. The absorber material 117 can include an absorber plate 157 or an absorber coating 158. The absorber plate 157 or the absorber coating 158 are disposed on the reflector substrate 156 to form the cylindrical shape of each of the control drums 115A-N. For example, the absorber plate 157 or the absorber coating 158 covers the reflector substrate 156 formed of the reflector material 116 to form the control drums 115A-N. When the reflector material 116 is the truncated portion of the cylinder, the absorber material 117 is a complimentary body shape to the truncated portion to form the cylindrical shape.

Control drums 115A-N can be formed of a continuous surface, e.g., rounded, aspherical, or spherical surfaces to form a cylinder or other conical surfaces to form a quadric surface, such as a hyperboloid, cone, ellipsoid, paraboloid, etc. Alternatively or additionally, the control drums 115A-N can be formed of a plurality of discontinuous surfaces (e.g., to form a cuboid or other polyhedron, such as a hexagonal prism). As used herein, "discontinuous" means that the surfaces in aggregate do not form a continuous outer surface 165 that is round (e.g., circular or oval) perimeter of the control drums 115A-N. In FIGS. 1A-B, the outer surface 165 shown is a rounded continuous surface.

Rotating the depicted cylindrical-shaped control drums 115A-N changes proximity of the absorber material 117 (e.g., boron carbide, B$_4$C) of the control drums 115A-N to the nuclear reactor core 101 to alter the amount of neutron reflection. When the reflector material 116 is inwards facing towards the nuclear reactor core 101 and the absorber material 117 is outwards facing, neutrons are scattered back (reflected) into the nuclear reactor core 101 to cause more fissions and increase reactivity of the nuclear reactor core 101. When the absorber material 117 is inwards facing towards the nuclear reactor core 101 and the reflector material 116 is outwards facing, neutrons are absorbed and further fissions are stopped to decrease reactivity of the nuclear reactor core 101.

Neutron reflector 140, e.g., shown as the outer reflector region, can be filler elements disposed between outermost nuclear fuel tiles 104A-N and the control drums 115A-N as well as around the control drums 115A-N. Reflector 140 can be formed of a moderator that is disposed between the outermost nuclear fuel tiles 104A-N and an optional barrel (e.g., formed of beryllium). The reflector 140 can include hexagonal or partially hexagonal shaped filler elements and can be formed of a neutron moderator (e.g., beryllium oxide, BeO). Although not required, nuclear reactor 107 can include the optional barrel (not shown) to surround the bundled collection that includes the insulator element array 112, moderator element array 113, nuclear fuel tile array 114 of the nuclear reactor core 101, as well as the reflector 140. As depicted, the control drums 115A-N reside on the perimeter of the pressure vessel 160 and can be interspersed or disposed within the reflector 140, e.g., surround a subset of the filler elements (e.g., reflector blocks 141A-N) forming the reflector 140.

Pressure vessel 160 can be formed of aluminum alloy, carbon-composite, titanium alloy, a radiation resilient SiC composite, nickel based alloys (e.g., Inconel™ or Haynes™), or a combination thereof. Pressure vessel 160 and nuclear reactor system 100 can be comprised of other components, including cylinders, piping, and storage tanks that transfer a moderator coolant that flows through moderator coolant passages 121A-N; and a separate nuclear fuel coolant, such as a propellant (e.g., hydrogen gas or liquid) that flows through the fuel coolant passages 141A-N. The moderator coolant and the nuclear fuel coolant can be a gas or a liquid, e.g., that transitions from a liquid to a gas state during a burn cycle of the nuclear reactor core 101 for thrust generation in an NTP nuclear reactor system 100. Hydrogen is for an NTP nuclear reactor system 100. In NEP or FSP applications, the nuclear reactor system 100 circulates a working fluid, such as He, neon, HeXe, $CO_2$, instead.

In the example of FIG. 1B, nuclear reactor system 100 enables the moderator coolant to flow through the moderator coolant passages 121A-N and a separate nuclear fuel coolant (e.g., a propellant, such as hydrogen gas) to flow through the fuel coolant passages 141A-N. The moderator coolant passages 121A-N are flattened ring shaped (e.g., O-shape) openings, such as a channels or holes to allow the moderator coolant to pass through in the nuclear reactor core 101 and into a heat sink (not shown) via a dedicated moderator coolant loop, for example. The fuel coolant passages 141A-N are channels or holes to allow the nuclear fuel coolant to pass through in the nuclear reactor core 101 and into a thrust chamber (not shown) for propulsion in a separate nuclear fuel coolant loop, for example.

In an alternative implementation, a coolant that is shared between the moderator elements 103A-N and the nuclear fuel tiles 104A-N may be flowed through both the moderator coolant passages 121A-N and the fuel coolant passages 141A-N. In the alternative implementation, the coolant that flows through the plurality of fuel elements 104A-N can include helium, FLiBe molten salt formed of lithium fluoride (LiF), beryllium fluoride ($BeF_2$), sodium, He, HeXe, $CO_2$, neon, or HeN. The shared coolant flows through the moderator coolant passages 121A-N before the shared coolant is heated in the nuclear fuel tiles 104A-N. This keeps the moderator elements 103A-N cool.

Returning to the automatic shutdown controller 111 of the nuclear reactor system 100, in a first implementation, the automatic shutdown controller 111 includes the single counterweight 125A that is external or internal to the plurality of control drums 115A-N to impart a bias on the plurality of control drums 115A-N. The automatic shutdown controller 111 further includes a single actuator 120A coupled to the counterweight 125A. A single electrical drive mechanism 119A is coupled to rotatably control the plurality of control drums and further coupled to the single actuator 120A. Additionally, all three components: the counterweight 125A-N, the actuator 120A, and the electrical drive mechanism 119A can be disposed within the pressure vessel 160. During the loss or interruption of the electrical power 153A-B from the power source 154A-B, a single counterweight 120A, single actuator 125A, and single electrical drive mechanism 119A can align the absorber material of the plurality of control drums 115A-N to face inwards towards the nuclear reactor core.

In a second implementation, automatic shutdown controller 111 includes a plurality of counterweights 125A-N. A respective counterweight 125A-N is coupled a respective control drum 115A-N of the plurality of control drums 115A-N. The respective counterweight 125A-N is external or internal to the respective control drum 115A-N to impart a respective bias on the respective control drum 115A-N. Although the counterweights 125A-N can be external or internal to the control drums 115A-N, in the examples of FIGS. 1A-B, the respective counterweight 125A-N is internal to the control drums 115A-N.

Counterweights 125A-N impart a bias on the control drums 115A-N. The bias includes a force that the counterweights 125A-N exert to move the control drums 115A-N to a decreasing neutron flux position when not counteracted by an opposing force of the electrical drive mechanism 119A-N, which occurs during a loss or interruption of electrical power 153A-B from the power source 154A-B. The bias attempts, but does not actually move the control drums 115A-N from the increasing neutron flux position to the decreasing neutron flux position when counteracted by the opposing force of the electrical drive mechanism 119A-N, which occurs during availability of electrical power 153A-B from the power source 154A-N.

In the second implementation, nuclear reactor system 100 can further include a plurality of electrical drive mechanisms 119A-N. The automatic shutdown controller 111 can further include a plurality of actuators 120A-N. A respective actuator 120A-N is coupled to the respective control drum 115A-N. A respective electrical drive mechanism 119A-N is coupled the respective control drum 115A-N and the respective actuator 120A-N.

In a third implementation, the automatic shutdown controller 111 can further include an intermediate number of actuators 120A-F and counterweights 125A-F, for example, five actuators 120A-F and counterweights 125A-F for ten control drums 115A-J.

FIG. 2A illustrates the automatic shutdown controller 111 of the nuclear reactor system 100, in which the actuator 120A includes a bevel gear 212 and a main axle 210. Although the counterweight 125A can be external or internal to the control drum 115A, in FIG. 2A the counterweight 125A is external to the control drum 115A. As shown, control drum 115A is coupled to the actuator 120A, which includes a mechanical actuator. The mechanical actuator includes a bevel gear 212. The bevel gear 212 includes a plurality of gears coupled to a main axle 210. The main axle 210 is coupled to the electrical drive mechanism 119A positioned opposite the control drum 115A. As shown, a secondary axle 211 can be coupled to the bevel gear 212, as well as the counterweight 125A.

The bias of the counterweight 125A includes a linear force. During the loss or interruption of the electrical power 153A-B to the power source 154A-B, the bevel gear 212 is responsive to the linear force of the counterweight 125A to rotatably control the control drum 115A to align the absorber material 117 to face inwards towards the nuclear reactor core 101. The counterweight 125A is pulled downward by the linear force of gravity, and causes the secondary axle 211 to turn. Bevel gear 212 of the actuator 120A then turns the main axle 210, causing the control drum 115A to rotate. The control drum 115A only rotates due to the force of gravity on the counterweight 125A until the absorber material 117 is facing toward the nuclear reactor core 101: this may be achieved by stops or gear slips within the actuator 120A, or by only allowing the counterweight 125A to travel a fixed distance before resting.

As further shown in FIG. 2A, the power source 154A-B can include a line power source 154A or a non-line power source 154B. Electrical power 153A-B from the power source 154A-B can be generated independently from the nuclear reactor core 101. When the electrical drive mechanism 119A is receiving electrical power 153A-B from the power source 154A-B, the rotational force of the electrical drive mechanism 119A on the main axle 210 overcomes the rotational force caused by the counterweight 125A, and causes the control drum 115A to rotate. The electrical drive mechanism 119A must apply enough rotational force to the main axle 210 in order to hold the counterweight 125A in an elevated position.

Although FIG. 2A depicts the counterweight 125A, electrical drive mechanism 119A, and control drum 115A in the same vertical alignment, the automatic shutdown controller 111 does not require the same vertical alignment to operate. For example, the actuator 120 that includes the bevel gear 212 can further include plurality of gears and a plurality of axles to ensure that the electrical drive mechanism 119A is able to direct force to lift the counterweight 125A, and to ensure both the counterweight 125A and the electrical drive mechanism 119A are able to direct force to rotate the control drum 115A. Additionally, the counterweight 125A can be forced downward by gravity, but in other examples the counterweight 125A may be under a different force. For example, in a spacecraft vehicle installation of an NTP nuclear reactor system 100, the spacecraft may rotate axially at a high speed to simulate the effects of gravity. In such a scenario, the force on the counterweight 125A is centrifugal, not gravitational.

FIG. 2B illustrates the automatic shutdown controller 111 of the nuclear reactor system 100, in which the actuator 120A includes a bevel gear 212 and the counterweight 225 includes a spring. The automatic shutdown controller 111 shown in FIG. 2B is an alternative to the gravitational counterweight 125A of FIG. 2A or a centrifugal force. The spring of the counterweight 225 is external to the control drum 115A. In this example, the bias includes an elastic force of the spring 225, such as an elastic force that causes the secondary axle 211 to turn the bevel gear 212, and the electrical drive mechanism 119A must overcome the resistance of the spring 225 to deformation in order to turn the control drum 115A. During the loss or interruption of the electrical power 153A-B, the actuator 120A is responsive to the elastic force of the spring to rotatably control the control drum 115A to align the absorber material 117 to face inwards towards the nuclear reactor core 101.

The automatic shutdown controller 111 implementation of FIG. 2B is both gravitationally and centrifugally agnostic. Additionally, the spring of the counterweight 225 can be oriented in any direction; whereas, the counterweight 125A necessarily must be oriented, such that the external force (e.g., gravity or centrifugal) moves the counterweight 125A from the apex position of the counterweight 125A to the nadir position of the counterweight 125A. For the automatic shutdown controller 111 with an external counterweight 125A, the spring of the counterweight 225 may replace the external counterweight 125A and still maintain substantially similar performance.

Figure 3A:
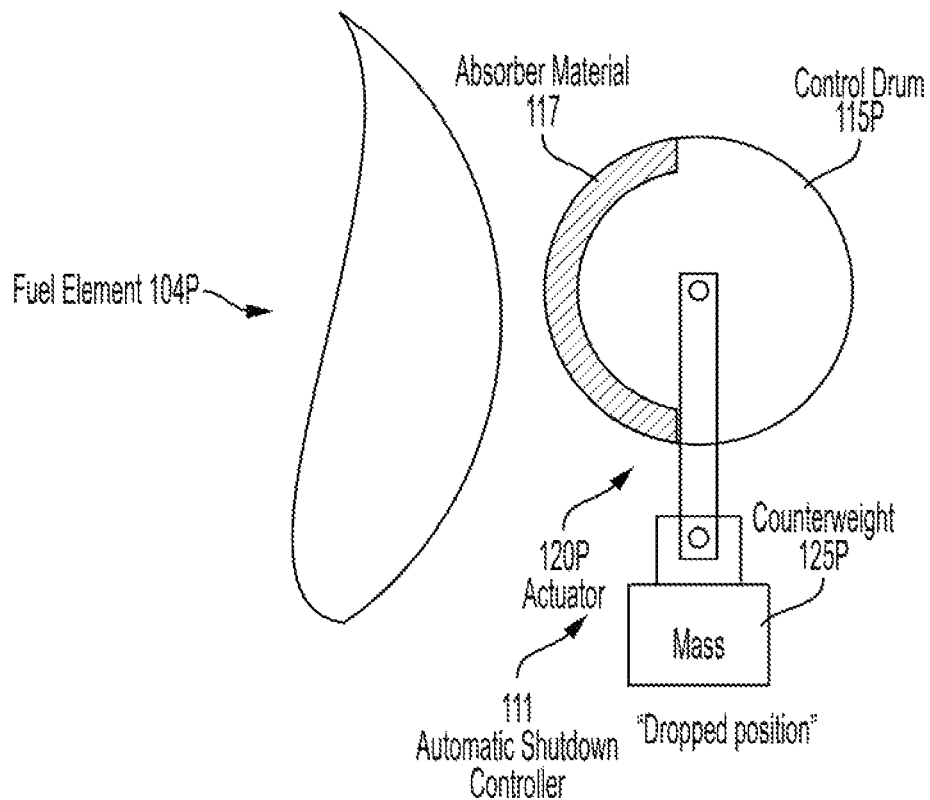
FIGS. 3A-B illustrate the automatic shutdown controller of the nuclear reactor system, in which the counterweight is external to the control drum and the actuator includes an arm.
Figure 3B:
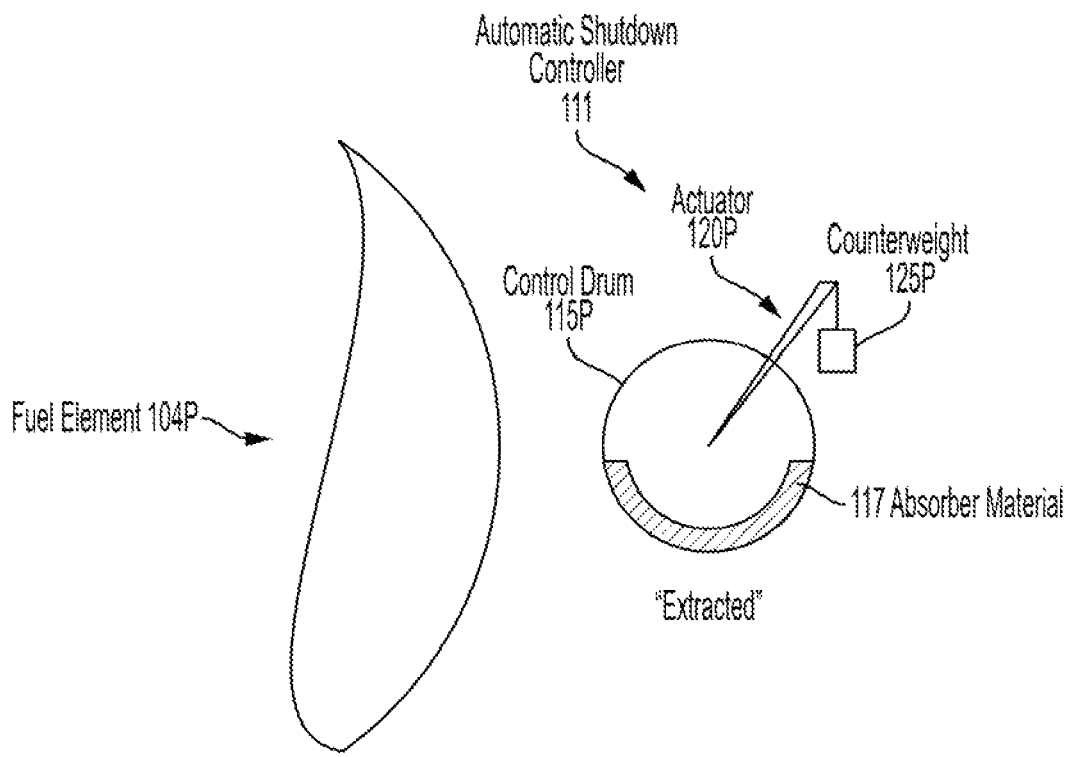

FIGS. 3A-B illustrate an alternative implementation to the automatic shutdown controller 111 of FIG. 1A, in which a counterweight 125P is external to a control drum 115P. In FIG. 3A, the control drum 115P is in the "dropped position" with the absorber material 117 facing inwards towards a fuel element 104P of the nuclear reactor core 101. The counterweight 125P is coupled to the control drum 115P via an actuator 120P (e.g., mechanical actuator) that includes an arm. The electrical drive mechanism 119P is not depicted, but operates similarly to FIG. 2A in that the electrical drive mechanism 119P lifts the counterweight 125P in order to turn the control drum 115P to the "extracted position." Note that the "extracted position" does not extract the control drum 115P from the nuclear reactor core 101, but rather rotates the control drum 115P.

The counterweight 125P and actuator 120P are permitted to freely rotate around at least half of the control drum 115P. During the loss or interruption of the electrical power 153A-B to the electrical drive mechanism 119P, the actuator 120P is responsive to the bias of the counterweight 125P. The counterweight 125P moves toward the nadir position of the counterweight 125P, below the control drum 115P. As the counterweight moves toward the nadir position of the counterweight 125P, the control drum 115P is rotated to align the absorber material 117 to face inwards toward the fuel element 104P of the nuclear reactor core 101 to decrease neutron flux, nuclear reactor operating temperature, and energy production.

In FIG. 3B, the control drum 115P is in the "extracted position" with the absorber material 117 facing away from the fuel element 104P to increase neutron flux. The absorber material 117 does not need to be fully facing away from the fuel element 104P to increase neutron flux. The reflector material 116 can still reflect back free neutrons from the fuel element 104P moving toward the absorber material 117 when the reflector material 116 is along the trajectory of free neutrons exiting the fuel element 104A moving toward the absorber material 117. Hence, as shown, during availability of the electrical power 153A-B from the power source 154A-B, the actuator 120P aligns an entirety or section of the absorber material 117 of the control drum 115P to face outwards away from the nuclear reactor core 101 to selectively control reactivity of the nuclear reactor core 101. As more absorber material 117 faces outwards away from the nuclear reactor core 101 and more reflector material 116 faces inwards towards the nuclear reactor core, the neutron flux, nuclear reactor core operating temperature, and energy output increase. The converse is also true.

When the electrical drive mechanism 119P receives electrical power 153A-B from the power source 154A-B, the electrical drive mechanism 119P rotates the control drum 115P to face the absorber material 117 away from the fuel element 104P, moving the control drum 115P to the "extracted position." The counterweight 125P is forced to the apex position of the counterweight 125P, above the control drum 115P. As the counterweight moves toward the apex position of the counterweight 125P, the control drum 115P is rotated to align the absorber material 117 to face outwards away from the fuel element 104P of the nuclear reactor core 101 to increase neutron flux, nuclear reactor operating temperature, and energy production.

FIG. 4A illustrates the automatic shutdown controller 111 of the nuclear reactor system 100, in which the actuator 120Q includes an electromagnetic coupling, and the automatic shutdown controller 111 further includes a guide surface 401, and a reciprocal surface 402. As shown, the automatic shutdown controller 111 further includes a guide ramp 400 that opposes a lower end 403 of the control drum 115Q. The guide ramp 400 includes a guide surface 401. Automatic shutdown controller 111 further includes a control drum reciprocal surface 402 that extends from the lower end 403 of the control drum 115Q.

The electrical drive mechanism 119Q, rather than turning a bevel gear of the actuator 120A, instead provides a current to magnetize an upper plate 410 of the electromagnetic coupling of the actuator 120Q. The magnetized upper plate 410 draws the lower plate 411 toward the upper plate 410, resulting in the actuator 120Q lifting the control drum 115Q. A counterweight 125Q is internal to the control drum 115Q (e.g., the control drum 115Q itself). The counterweight 125Q imposes the bias that includes a linear force against the actuator 120Q, but the electromagnetic coupling of the actuator 120 counteracts the bias.

During the loss or interruption of the electrical power 153A-B from the power source 154A-B to the electrical device mechanism 119A, the guide surface 401 is responsive to the linear force of the counterweight 119Q and the control drum reciprocal surface 402 to rotatably control the control drum 115Q to align the absorber material 117 to face inwards towards the nuclear reactor core 101. The weight of the control drum 115Q pulls the lower plate 411 away from the upper plate 410, and results in the control drum 115Q falling when the electrical power 153A-B during the loss or interruption of the electrical power 153A-B.

When electrical power to the electrical drive mechanism 119Q is lost or interrupted, the upper plate 410 and the lower plate 411 of the electromagnetic coupling of the actuator 120Q separate. However, falling alone does not cause the control drum 115Q to rotate. Therefore, on the underside of the control drum 115Q is the control drum reciprocal surface 402. The guide surface 401 of the guide ramp 400 is shaped as an inclined plane and the control drum reciprocal surface 402 is shaped as a complimentary inclined plane. The inclined plane is wrapped helically around an axis (e.g., a similar simple machine is a screw) and the complimentary inclined plane is wrapped helically around the axis. However, the central columnar axis of the control drum reciprocal surface 402, analogous to the central column of a screw, may be hollow, may only extend half of the height of the guide surface 401, or may have a radius of zero. The guide surface 401 is chiral to the control drum reciprocal surface 402. The guide surface 401 is designed such that the control drum reciprocal surface 402 tightly nests within the guide surface 401 during the loss or interruption of the electrical power 153A-B.

Figure 4C:
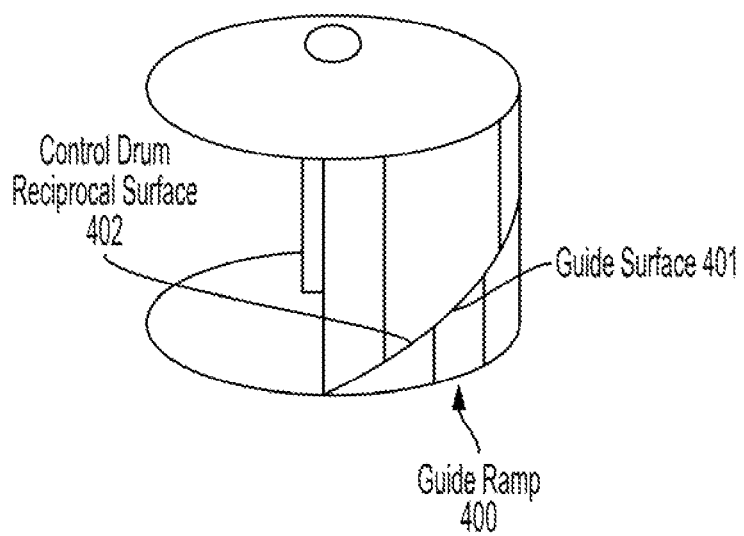
FIG. 4C illustrates the guide surface and the control drum reciprocal surface after rotation.
Figure 4D:
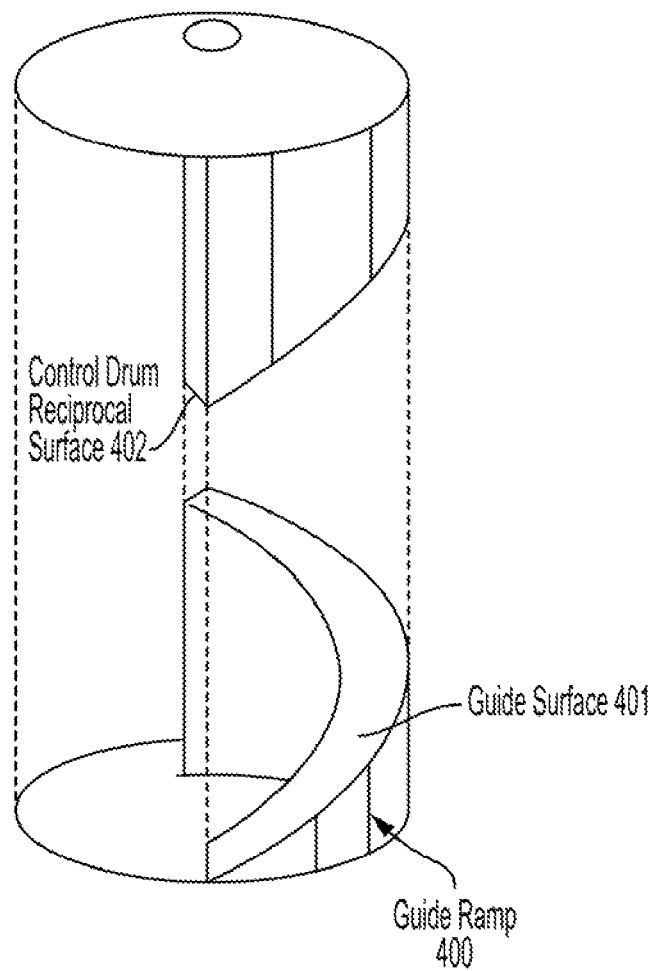
FIG. 4D is an exploded view of FIG. 4C.

FIGS. 4B-D further illustrate the guide surface 401 and the control drum reciprocal surface 402. In FIG. 4B, the control drum 115Q is suspended by the actuator 120Q; and the guide surface 401 and control drum reciprocal surface 402 are not in contact. The highest part 406 of the guide surface 401 and the lowest part 404 of the control drum reciprocal surface 402 are overlapping each other. Once the control drum 115Q is released by the actuator 120Q during the loss or interruption of the electrical power 153A-B, the control drum 115Q falls and the highest part 406 of the guide surface 401 and the lowest part 404 of the control drum reciprocal surface 402 make contact.

Due to the reciprocal slopes of the guide surface 401 and the control drum reciprocal surface 402, the guide surface 401 and the control reciprocal surface 402 slide across the face of the other. However, the control reciprocal face 402 is fixed in position, so only the guide surface 401 and control drum 115Q move. Additionally, the control drum 115Q is inside a cylindrical column, meaning that the control drum 115Q can only move vertically or rotate. Therefore, movement of the control drum 115Q down along with the control drum reciprocal surface 402 moving along the face of the guide surface 401, rotates the control drum reciprocal surface 402, and thereby rotates the control drum 115Q.

Ultimately, the guide surface 401 and control drum reciprocal surface 402 reach the position in FIG. 4C. The control drum reciprocal surface 402 cannot fall any further as the highest part 406 of the guide surface 401 has met the lower part of the control drum reciprocal surface 402. Friction prevents the control drum reciprocal surface 402 from over-rotating, but instead of a void as depicted in FIGS. 4B-D, the voided half of the guide surface 401 and control reciprocal surface 402 can form a half cylinder wall, completely enclosing the volume of the guide surface 401 and the control reciprocal surface 402.

Additionally, rather than a voided core between the guide surface 401 and control reciprocal surface 402, a narrower cylinder can be placed within the guide ramp 400 or control drum reciprocal surface 402 ramp in order to improve physical support and reduce the likelihood of over-rotation of the control drum 115Q. Additionally, at the end of either the guide ramp 400 or control drum reciprocal surface 402 ramp, a block can be placed to prevent over rotation. FIG. 4D provides an exploded view of FIG. 4C, with dotted lines illustrating which points of the guide surface 401 and control reciprocal surface 402 are aligned. Furthermore, FIGS. 4B-D have a small oval depicted on the top of the guide surface 401, in order to facilitate a viewer determining which direction the guide surface 401 is facing within the Figures.

Figure 5:
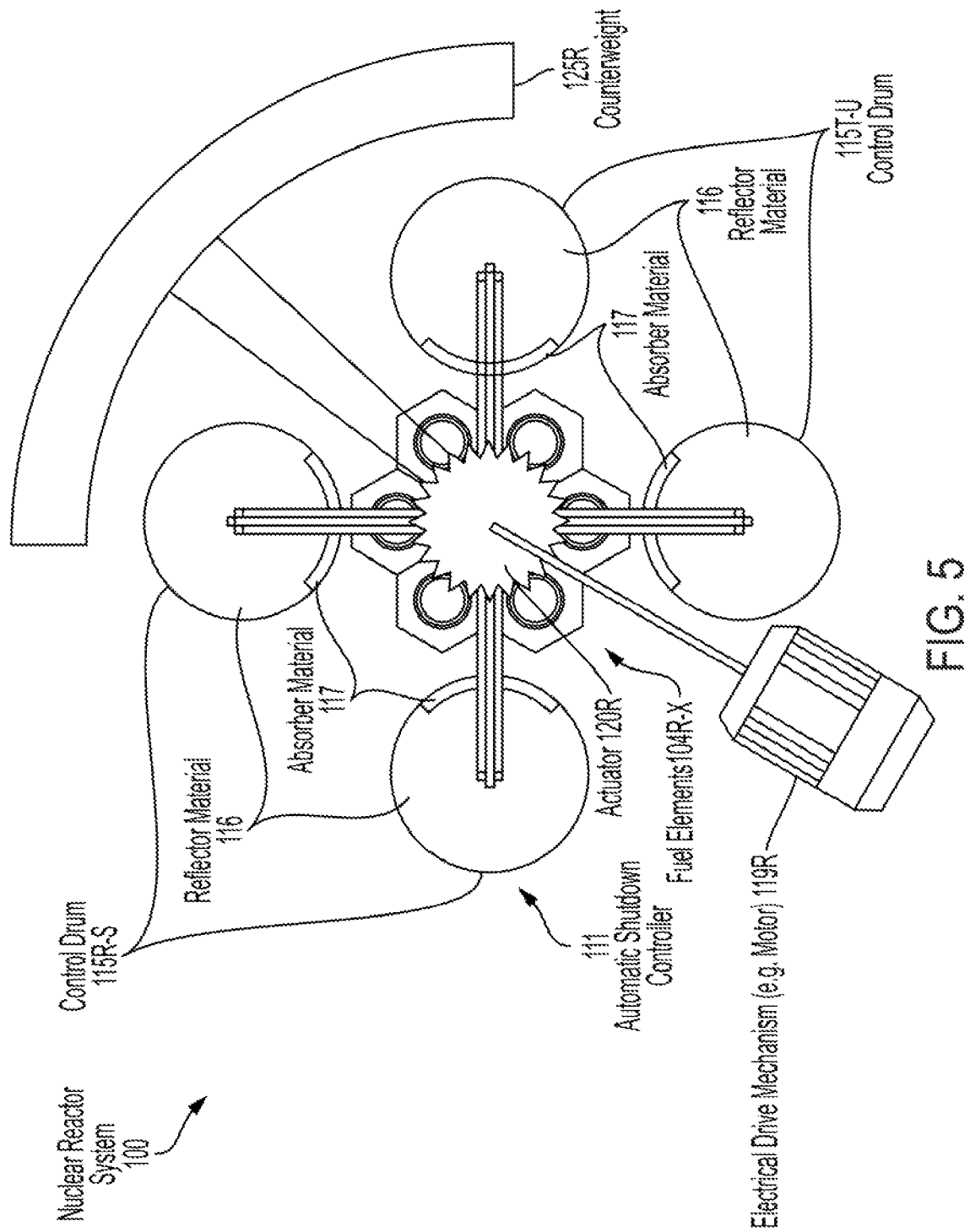
FIG. 5 illustrates a nuclear reactor system with control drums rotatably controlled by a single actuator, a single electrical drive mechanism, and a single counterweight.

FIG. 5 is an illustration of a nuclear reactor system 100 with the plurality of control drums 115R-U rotatably controlled by a single actuator 120R, a single electrical drive mechanism 119R, and a single counterweight 125R. This example is similar to FIG. 1B in that there are a plurality of fuel elements 104R-X surrounded by the plurality of control drums 115R-U. Each control drum 115R-U is coupled to an actuator 120R that includes the bevel gear 212. The actuator 120R is coupled to a counterweight 125R, external to the control drums 115R-U and heavy enough to rotate all of the control drums 115R-U in the nuclear reactor system 100. The electrical drive mechanism 119R is strong enough and receives electrical power 153A-B from the power source 154A-B to rotate all of the control drums 115R-U, as well as move the counterweight 125R to the apex position of the counterweight 125R. The electrical drive mechanism 119R, actuator 120R, and counterweight 125R all interact with each other in the same manner as the electrical drive mechanism 119A, actuator 120A, and counterweight 125A in FIG. 2A. As in FIG. 2A, the counterweight 125R can be replaced with a counterweight 225 that includes a sufficiently large spring (see FIG. 2B). The actuator 120R rotates all of the control drums 115R-U equally, and the control drums 115R-U are configured such that when the counterweight 125R is at the apex position of the counterweight 125R, the absorber material 117 of each control drum 115R-U is facing away from the fuel elements 104R-X, and that when the counterweight 125R is at the nadir position of the counterweight 125R, the absorber material 117 of each control drum 115R-U is facing toward the fuel elements 104R-X.

Figure 6A:
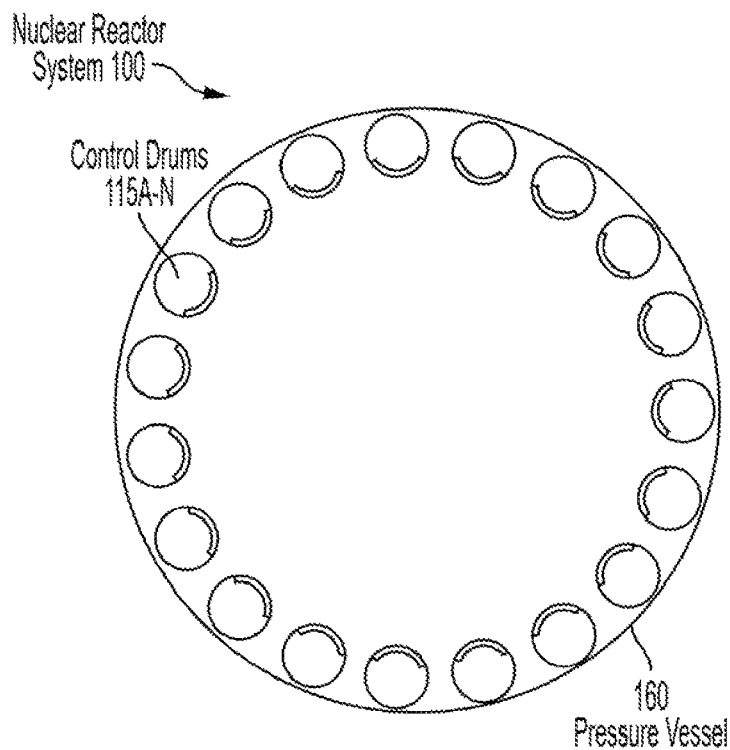
FIG. 6A-B shows the effect of rotating the control drums of FIG. 1B simultaneously, by the automatic shutdown controller.
Figure 6B:
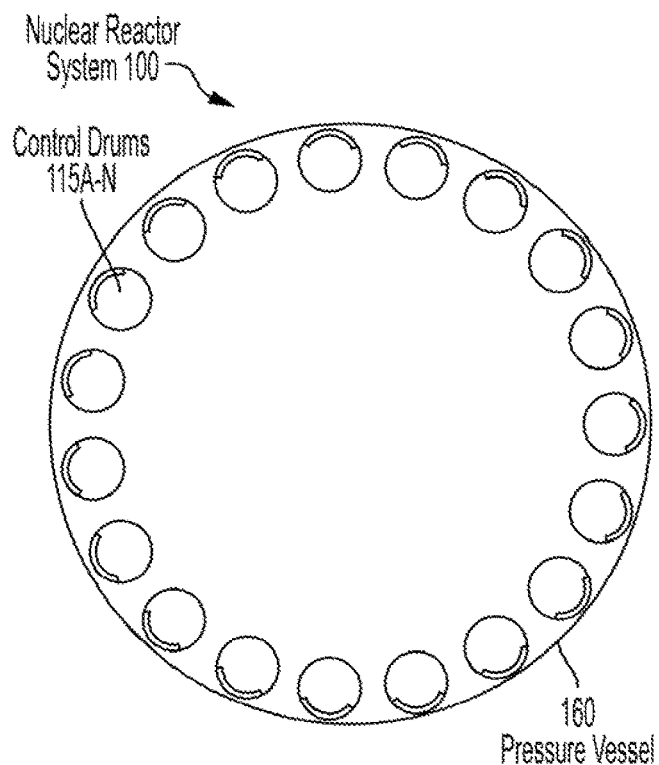

FIG. 6A-B shows the effect of rotating the control drums 115A-N of FIG. 1B simultaneously, by the automatic shutdown controller 111. In the nuclear reactor system 100, the automatic shutdown controller 111 can include individual, non-shared actuators 120A-N and counterweights 125A-N for each of the control drums 119A-N to simultaneously rotate the control drums 115A-N during the loss or interruption of the electrical power 153A-B to the electrical device mechanism 119A-N. Alternatively, as described in FIG. 5, the automatic shutdown controller 111 can include a single actuator 120R and a single counterweight 125R to simultaneously rotate the control drums 115A-N during the loss or interruption of the electrical power 153A-B.

In FIG. 6A, all of the control drums 115A-N are in the "dropped position" of FIG. 3A. The absorber material 117 of the control drums 115A-N faces inwards towards the nuclear reactor core 101 at the center of the pressure vessel 160. In FIG. 6B, all of the control drums 115A-N are in the "extracted position" of FIG. 3B. The absorber material 117 of the control drums 115A-N faces outwards away from the nuclear reactor core 101 at the center of the pressure vessel 160.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A nuclear reactor system, comprising:
   a pressure vessel;
   a nuclear reactor core disposed in the pressure vessel, the nuclear reactor core including a plurality of fuel elements and at least one moderator element;
   a plurality of control drums disposed longitudinally within the pressure vessel and laterally surrounding the plurality of fuel elements and the at least one moderator element to control reactivity of the nuclear reactor core, wherein each of the control drums includes a reflector material on a first portion of an outer surface and an absorber material on a second portion of the outer surface;
   an automatic shutdown controller including:
      a counterweight that is internal to a control drum of the plurality of control drums to impart a bias on the control drum,
      an actuator coupled to the counterweight,
      a guide ramp that opposes a lower end of the control drum and includes a guide surface, and
      a control drum reciprocal surface that extends from the lower end of the control drum; and
   an electrical drive mechanism that is: (a) powered by electrical power from a power source, (b) coupled to rotatably control the control drum, and (c) further coupled to the actuator, wherein:
      both the electrical drive mechanism and the actuator counteract the bias of the counterweight during availability of the electrical power from the power source, and
      during a loss or interruption of the electrical power from the power source such that the electrical power is no longer available to the electrical drive mechanism and the actuator, the guide surface is responsive to the bias of the counterweight and the control drum reciprocal surface to rotatably control the control drum to align the absorber material to face inwards towards the nuclear reactor core.

2. The nuclear reactor system of claim 1, wherein:
   the electrical drive mechanism includes a motor.

3. The nuclear reactor system of claim 1, wherein the automatic shutdown controller further includes:
   a plurality of counterweights, wherein a respective counterweight is coupled a respective control drum of the plurality of control drums.

4. The nuclear reactor system of claim 3, further comprising a plurality of electrical drive mechanisms, wherein:
   the automatic shutdown controller further includes a plurality of actuators, wherein a respective actuator is coupled the respective control drum; and
   a respective electrical drive mechanism is coupled the respective control drum and the respective actuator.

5. The nuclear reactor system of claim 1, wherein:
   the counterweight, the actuator, and the electrical drive mechanism are disposed within the pressure vessel.

6. The nuclear reactor system of claim 1, wherein:
the actuator includes an electromagnetic coupling;
the electrical drive mechanism includes a motor;
the bias includes a linear force; and
during the loss or interruption of the electrical power, the guide surface is responsive to the linear force of the counterweight.

7. The nuclear reactor system of claim 1, wherein:
the guide surface is shaped as an inclined plane; and
the control drum reciprocal surface is shaped as a complimentary inclined plane.

8. The nuclear reactor system of claim 7, wherein:
the inclined plane is wrapped helically around an axis; and
the complimentary inclined plane is wrapped helically around the axis.

9. The nuclear reactor system of claim 1, wherein:
the electrical power from the power source is generated independently from the nuclear reactor core; and
the power source includes a line power source or a non-line power source.

10. The nuclear reactor system of claim 1, wherein:
each of the control drums is a cylindrical shape; and
the outer surface is an outer circumference of the cylindrical shape.

11. The nuclear reactor system of claim 10, wherein:
the reflector material includes a reflector substrate shaped as a cylinder or a truncated portion thereof;
the absorber material includes an absorber plate or an absorber coating; and
the absorber plate or the absorber coating are disposed on the reflector substrate to form the cylindrical shape of each of the control drums.

12. The nuclear reactor system of claim 1, wherein during availability of the electrical power from the power source, the actuator aligns an entirety or section of the absorber material of the control drum to face outwards away from the nuclear reactor core to selectively control reactivity of the nuclear reactor core.

13. The nuclear reactor system of claim 12, wherein:
during availability of the electrical power from the power source, the electrical drive mechanism maintains the control drum at a permanently fixed longitudinal position.

14. The nuclear reactor system of claim 1, wherein:
each of the fuel elements includes a nuclear fuel;
the nuclear fuel includes a fuel compact comprised of coated fuel particles embedded inside a high-temperature matrix; and
the high-temperature matrix includes silicon carbide, zirconium carbide, titanium carbide, niobium carbide, tungsten, molybdenum, or a combination thereof.

15. The nuclear reactor system of claim 14, wherein:
the coated fuel particles includes tristructural-isotropic (TRISO) fuel particles or bistructural-isotropic (BISO) fuel particles.

16. The nuclear reactor system of claim 1, further comprising a reflector, wherein:
the control drums are interspersed or disposed within the reflector.

\* \* \* \* \*